Dec. 25, 1956  V. E. SWENSON  2,775,134
SHIFTER MECHANISM FOR TRANSMISSION
Filed Aug. 12, 1955  2 Sheets-Sheet 1
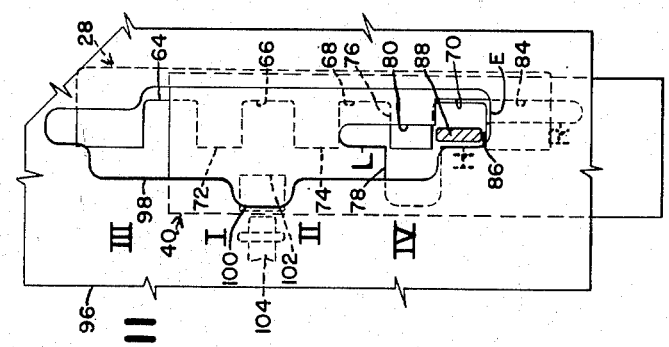
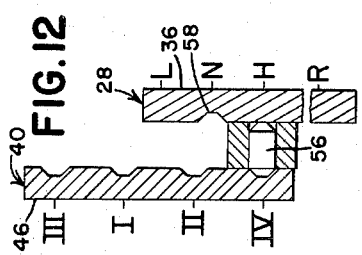
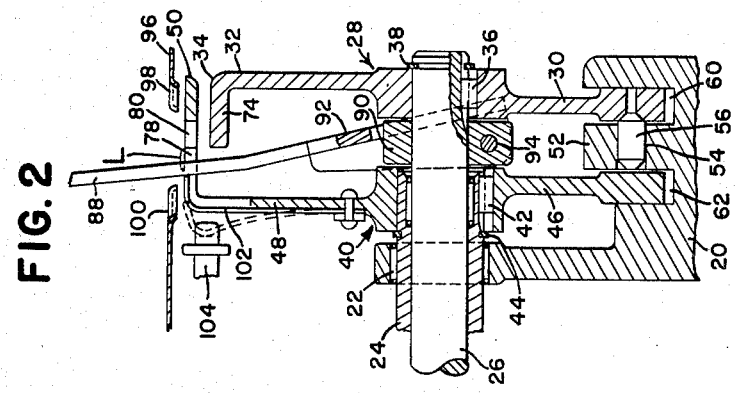
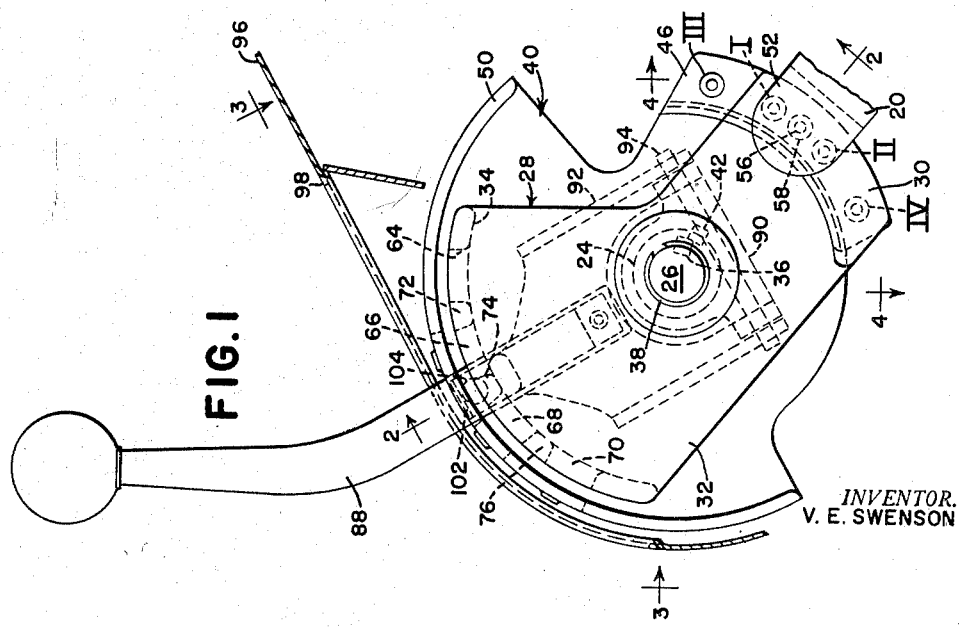
INVENTOR.
V. E. SWENSON

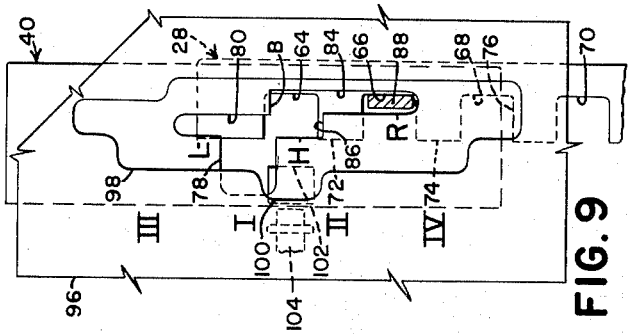

United States Patent Office 2,775,134
Patented Dec. 25, 1956

2,775,134

SHIFTER MECHANISM FOR TRANSMISSION

Victor Eugene Swenson, Cedar Falls, Iowa, assignor to Deere Manufacturing Co., Dubuque, Iowa, a corporation of Iowa Application August 12, 1955, Serial No. 528,075

4 Claims. (Cl. 74—473)

This invention relates to shifter mechanism for a multi-speed, multi-range transmission and more particularly to such mechanism as employs a single shift lever capable of movement among several positions.

The shifting mechanism forming the subject matter of this case is particularly adaptable to a transmission of the character covered by the Du Shane and Rugen Patent 2,710,546, which transmission is of the type having an input shaft, a countershaft and an output shaft, together with means for driving the countershaft in either of two forward ranges or one reverse range, plus shiftable gears between the countershaft and the output shaft for establishing a plurality of speeds. In such transmissions, the number of speeds is doubled by the range means. Although transmissions of the general type referred to are known, most of them require separate shift levers for achieving range changes and speed changes. According to the present invention, a single lever is useful for both purposes.

Experience has shown that in single-lever installations, in which the transmission has a plurality of ranges, one of which is a reverse range, there is the occasional possibility that the operator may overshift and accidentally attempt to mesh gears not intended to be meshed at that time. Therefore, it is one of the principal objects of the present invention to provide shifting mechanism in which overshifting is impossible. It is a specific object of the invention to provide shifting mechanism having a pair of side-by-side selectors, one for achieving range changes and the other for achieving speed changes, together with an intervening lever, the arrangement being so designed that the lever must follow a defined pattern to obtain the desired range and speed changes. The pattern-defining means includes a zig-zag slot including elongated portions in which the lever is movable and a crossover portion through which the lever must be shifted laterally before it can move from one elongated portion to the other. Hence, the terminal end of each elongated portion and the crossover portion serve as limit means to prevent accidental overshifting. The invention further features interlock means between the selectors so that the selectors must be moved in a certain order.

The foregoing and other important objects and desirable features inherent in and encompassed by the invention will become apparent as a preferred embodiment thereof is disclosed in detail in the ensuing specification and accompanying drawings, the several figures of which will be described immediately below.

Fig. 1 is a side elevational view of the shifting mechanism.

Fig. 2 is a section on the line 2—2 of Fig. 1.

Fig. 3 is a plan view, partly in section, as seen generally along the line 3—3 of Fig. 1, with the exception that the curved surfaces have been "developed" and shown as flat for purposes of illustration; the illustrated components are in their neutral positions.

Fig. 4 is a section on the line 4—4 of Fig. 1, the components also being in neutral positions.

Fig. 5 is a view similar to Fig. 3 but shows a preliminary stage in shifting.

Fig. 6 is a view like Fig. 4 but shows the interlock means according to the shifting stage of Fig. 5.

Fig. 7 is a view like Figs. 3 and 5 and shows a further stage in the shifting operation.

Fig. 8 is similar to Figs. 4 and 6 but shows the interlock means corresponding to the stage of Fig. 7.

Fig. 9 shows a still further stage in shifting.

Fig. 10 shows the interlock means corresponding to the stage shown in Fig. 9.

Fig. 11 illustrates the lock-out of high-speed reverse in the shifting operation.

Fig. 12 illustrates the interlock corresponding to the stage of Fig. 12.

In general, only so much of the shifting mechanism is illustrated as is deemed necessary to an understanding of the present invention. Therefore, the transmission mechanism itself has been omitted. In the interests of clarity, certain expressions such as "front," "rear" etc., have been used in the specification and claims, but it is to be understood that different directional characteristics may be employed without sacrificing the principles of the invention.

The shifting mechanism as a whole, best illustrated in Figs. 1 and 2, includes a support 20 having a bearing 22 in which a tubular rockshaft 24 is journaled. A second rockshaft 26 is journaled within the tubular rockshaft and has one end thereof projecting beyond the right hand end of the tubular rockshaft. The rockshaft 24 is connected in any appropriate manner to shiftable means in a transmission (not shown, but such as in the above-mentioned patent) so that rocking of this rockshaft selectively sets up different gear ratios between the countershaft and output shaft. The rockshaft 26 is connected to transmission means for selectively setting up different gear ratios between the input shaft and the countershaft. For convenience, the gear ratios between the input shaft and the countershaft will be referred to as range changes and, in the transmission already mentioned, these ranges include low, high and reverse. The gear ratio changes between the countershaft and the output shaft are known and will be referred to herein as speed changes. Hence, in a transmission of the type under consideration several speed changes may be obtained in low range and the same number of speed changes may be obtained in high range; hence, the number of forward speeds is doubled. Moreover, the same number of speed changes may be obtained in the reverse range, with one exception, to be noted later.

The rockshaft 26 has keyed to the outer end thereof a range selector 28 which has a depending leg 30 and a vertical web 32 at the top of which is integrally formed an arcuate flange 34. Affixation of the selector 28 to the right-hand end of the rockshaft 26 may be accomplished, as shown, by a key 36 and retaining ring 38.

A speed selector 40 is keyed to the right hand end of the rockshaft 24, in axially spaced relation to or to the left of the range selector 28, affixation being accomplished by a key 42 and retaining ring 44. The speed selector 40 has a depending leg 46 and an upstanding web 48 which has its upper end in the form of an arcuate flange 50 extending laterally toward the flange 34 and in concentrically overlapping relation thereto. Since the rockshafts 24 and 26 are independently journaled, they may be selectively and independently actuated by the selectors 40 and 28.

The depending legs 30 and 46 of the range and speed selectors, respectively, lie in side-by-side relationship and are laterally spaced apart. An upright ear 52 on the support 20 has therein a transverse bore 54 in which a locking plunger 56 is shiftable. The range selector leg 30 has therein a single notch 58 which receives the right hand end of the plunger 56 when both selectors are in their respective neutral positions (Figs. 1, 2, 3 and 4). The depending leg 46 of the speed selector has a plurality (here four) of notches, designated respectively as I, II, III and IV, which designation is employed to correspond to the same designation for the different positions of the speed selector, as will be described below.

As best shown in Fig. 4, the intervening flat portion between notches I and II causes the plunger 56 to be forced into the single notch 58 when both selectors are in neutral. Hence, the range selector cannot be moved unless the speed selector is first moved, which situation is shown in Fig. 6, wherein it will be seen that the notch opposite I becomes alined with the plunger 56 when the speed selector 40 is moved to its first or No. I position. Hence, fore or aft movement of the range selector will cam the plunger out of the notch 58 and will force it into the notch I of the speed selector 40, which is the condition shown in Fig. 8. The flat interface of the range selector leg 30 will now keep the plunger 56 engaged with the speed selector notch and will keep the speed selector locked against movement while the range selector is movable. These same results are obtained throughout the four positions of the speed selector 40 and the three range positions of the range selector 28. The legs 30 and 46 of the selectors are appropriately guided and therefore held against lateral displacement, because they run respectively in grooves 60 and 62 in the support 20.

The flange 34 of the range selector 28 is provided with a plurality of notches, numbered here from front to rear as 64, 66, 68 and 70. These notches are separated by intervening lugs 72, 74 and 76. Each notch opens laterally toward the speed selector 40 and, of course, the lugs project in the same direction.

The flange 50 on the speed selector 40 has therein a lateral pocket 78 which opens in the direction of the range selector and communicates with a fore-and-aft extending zig-zag slot 80. This slot comprises front and rear fore-and-aft extending portions 82 and 84, respectively, that are laterally offset and interconnected by a crossover portion 86.

When the selectors are both in their respective neutral positions, the following conditions obtain: The lug 74 registers with and blocks the pocket 78 (Fig. 3). The front portion 82 extends ahead of the lug 74 and is in vertical or radial register with the range selector notch 66. This forward portion of the slot portion 82 is designated by the letter L. The crossover portion of the zig-zag slot is rearwardly of the lug 74 and includes a rearward extension of the slot portion 82, labeled H, which portion is in lateral and radial register with the range selector notch 68. The rearward portion 84 of the zig-zag slot is laterally offset in the direction of the range selector and extends rearwardly beyond the lug 76 and over the rearwardmost notch 70 in the range selector. The rearwardmost part of the rearward slot portion 84 is labeled R. The letters L, H and R stand, respectively, for low, high and reverse.

Selective shifting of the selectors is accomplished by a shift lever 88 which is carried by the support 20, in a manner presently to be described, for both fore-and-aft and lateral shifting. The mounting means for the lever comprises a collar 90 loose on the rockshaft 26 between the selectors 28 and 40. The lower portion of the lever is in the form of a yoke 92 which straddles the collar and is loosely pinned thereto by a fore-and-aft pin 94. Since the collar 90 is loose on the rockshaft 26, the lever may have movement fore-and-aft. The pin 94 enables the lever 88 to move laterally. In the neutral positions of the parts, the lever 88 extends upwardly through the pocket 78 and is confined against escape from the pocket by the lug 74 on the range selector.

The support includes an index plate 96 overlying the selectors and having therein an opening 98 through which the lever 88 extends and through which portions of the selectors are visible, it being remembered that the speed selector flange 50 overlies the range selector flange 34; therefore, only such portions of the range selector flange can be seen as are exposed through the zig-zag slot 80 in the speed selector flange. Also visible through the opening 98 in the index plate are the indicia represented by the letters L, H and R on the top surface of the speed selector flange 50. In addition, the index plate 96 carries along the left hand edge of the opening 98 indicia designating the different speeds obtainable in the transmission. In the interests of convenience, these indicia include the numerals I, II, III and IV; although, in a commercial structure the indicia would represent the actual speeds obtainable from the transmission. The opening 98 is shaped in such manner as to contribute to the formation of the pattern that must be followed by the lever 88 in shifting the transmission among its several speeds and ranges.

In the form of the invention disclosed here, the index plate opening 98 communicates at a left hand central portion thereof with a recess 100 that is in lateral register with the pocket 78 when the speed selector is in its neutral position. The purpose of the recess is to enable lateral shifting of the lever 88 to the left of the position shown in Figs. 2 and 3, whereby the lever may engage a leaf spring member 102 which in turn engages an actuator in the form of a button 104 which is connected to the starter (not shown) for the vehicle in which the mechanism is employed. It will be noted that the starter button 104 can be actuated by the lever 88 only when the lever is in its neutral position.

*Operation*

The relationship of the parts in their respective neutral positions has been covered somewhat above; although, brief repetition may be resorted to in the interests of clarity. The lever 88 extends neutrally upwardly through the pocket 78, between the leaf spring member 102 and the lug 74 on the range selector. Assuming that the lever has already been moved to the left to actuate the starter button 104 and has been moved back to the position shown in Fig. 3, the operator may now use the lever to shift the speed selector either forwardly or rearwardly. The locking plunger 56 enters the notch in the range selector leg 30 and is held therein by the speed selector leg 46 (Fig. 4). Hence, in the neutral position, the range selector cannot be moved first. Moreover, the lever 88 is confined against escape from the pocket 78 by the range selector lug 74 and therefore the lever is available at this time only to move the speed selector. However, the lock as established in Fig. 4 is important from the standpoint of preventing accidental shifting of the range selector without first shifting the speed selector.

Assuming that position No. I is desired, the lever 88 is moved forwardly to the Fig. 5 position. The pocket 78 now clears the lug 74 and is alined with the range selector notch 66. The shape of index plate opening 98 is such as to prevent lateral shifting of the lever 88 to the left, as at A. Hence, the starter button cannot be inadvertently actuated. The lever 88, now in alinement with the range selector notch 66, may be shifted to the right and into that notch. The right hand edge of the front zig-zag slot portion 82 prevents excess rightward movement of the lever 88. Hence, the lever will be confined for fore-and-aft travel in the fore portion 82 of the zig-zag slot, opposite ends of which are delineated by the portions L and H. In other words, once the lever 88 is in the range selector notch 66, it may move in unison with the range selector between the L and H positions. When the speed selector has been moved by the lever 88 to the Fig. 5 position, it has set up a certain gear ratio in the transmission between the counter shaft and the output shaft. However, the transmission is still in neutral, because there remains the requirement that the range selector be shifted before a range ratio is established between the counter shaft and the input shaft. Low range is established by moving the lever 88 forwardly and high range is established by moving the lever rearwardly. The latter is shown in Fig. 7. Therefore, the transmission is now operating with one gear ratio between the input shaft and the counter shaft and another gear ratio between the counter shaft and the output shaft. It will be noted that when the lever 88 is in the H position, rearward movement thereof in excess of that position is prevented by the crossover portion 86 of the zig-zag slot 80. It can be readily appreciated from Fig. 7 that the lever 88 can be moved forwardly in the fore portion of the zig-zag slot and its forward movement will be stopped at the L position because of the terminal end of the zig-zag slot. Since the indicia L, H and R are readily visible through the index plate opening 98, the operator knows precisely the output speed of the transmission controlled by the shifting mechanism.

As previously described, the relative positions of the selectors as achieved in Fig. 5 releases the locking plunger 56 from the range selector. Therefore, the range selector can be moved to the Fig. 7 position, as will be apparent from the relationship of the locking structure as illustrated in Fig. 8, wherein it is shown that the speed selector in moving from its neutral to its H position forces the plunger 56 to the left and into the No. I locking notch in the speed selector. The locked relationship of the speed selector will be maintained during movement of the range selector, except when the range selector is brought back to its neutral position (Fig. 4). Therefore, if the speed selector is locked, the end portions and crossover portion of the zig-zag slot serve as limit means for regulating the range of fore-and-aft movement of the lever 88 and thus preventing overshifting. One example of overshifting prevention is illustrated in Fig. 7, wherein it is shown that the lever 88 cannot be inadvertently moved rearwardly beyond the H position, unless it is first shifted laterally through the crossover to become alined with rear portion 84 of the zig-zag slot 80, after which it can be moved rearwardly to the R position. In the transmission already referred to, the R position of the lever reverses the direction of rotation of the counter shaft by mechanism between the input shaft and the counter shaft but the speed ratio previously selected at I between the counter shaft and the output shaft remains the same.

The front part of the crossover 86, as at B serves as a limit on forward movement of the lever 88 when shifting from reverse to high and therefore prevents overshifting to low unless the lever is first moved to the left across the crossover.

With the lever 88 in the position of Fig. 5, before it is moved laterally into the notch 66, an additional forward speed can be had by moving the lever and speed selector to the No. III position, the limit on which movement is established by a forward edge portion C of the index plate opening 98. Additional positions for the speed selector are shown at II and IV, a limit for the latter being established by an index plate opening portion D so that the fore-and-aft range of movement of the lever 88, when in the pocket 78, is established by the portions C and D.

It was previously stated herein that the number of speeds in the transmission, in a forward direction, were doubled by means of the high and low range characteristics. It was also stated that one-half the total number of forward speeds could be obtained in reverse, with one exception. This exception occurs because of the particular shape of the rear portion of the index plate opening 98, best illustrated in Fig. 11. This figure shows that the lever 88 was, while in the pocket 78 of the speed selector, moved to the No. IV position and then laterally to the right into the rearwardmost range selector notch 70, after which the lever 88 was moved rearwardly to obtain high range. It will be apparent from this figure that even though the lever 88 can be shifted through the crossover of the zig-zag slot, it cannot be moved rearwardly in the rear portion 84 of the zig-zag slot, because the portion of the index plate at E blocks such movement. The purpose of this arrangement is that in the particular transmission, the No. IV speed ratio between the counter shaft and the output shaft is too high for practical use as a reverse speed. Hence, in the interests of safety, it is blocked out.

From the foregoing description, it will be seen that an improved, simple and extremely flexible shifting mechanism is afforded by the present design. Not only is a single lever usable as the sole instrumentality for shifting, but the shifting pattern is so arranged as to eliminate inadvertent overshifting and to also eliminate inadvertent premature shifting of one selector or out of order shifting of either selector. Other advantages of the invention, not categorically enumerated herein, will undoubtedly occur to those skilled in the art, as will many modifications and alterations in the preferred embodiment of the invention, all of which may be achieved without departing from the spirit and scope of the invention.

What is claimed is:

1. Shifting mechanism for a multi-speed, multi-range transmission, comprising: a support; a range selector and a speed selector carried by the support in coaxially spaced apart side-by-side relation for independent fore-and-aft rocking out of and back to respective neutral positions, said selectors respectively having arcuate flanges extending axially toward each other in concentrically overlapped relation; said range selector flange having front and rear circumferentially spaced notches opening laterally toward the speed selector and separated by an intervening lug projecting laterally toward said speed selector; said speed selector flange having therein a pocket opening laterally toward the range selector and laterally blocked by said lug when both selectors are neutrally positioned, said speed selector flange further having a zig-zag slot including front and rear circumferential portions laterally offset and interconnected by a crossover portion, said crossover portion lying behind the lug and in radial register with the rear notch, the rear portion lying adjacent to the range selector and extending rearwardly past the rear notch, and the front portion lying remote from the range selector and extending forwardly past the lug to intersect the pocket and to register radially with the front notch when both selectors are neutrally positioned; a shift lever extending radially from the selector axis and through the pocket to be confined by the lug against lateral escape from said pocket; and means mounting the shift lever on the support coaxially with the selectors and for rocking and lateral shifting relative to the selectors, whereby the pocket-received lever is movable selectively forwardly or rearwardly to rock the speed selector to a selected speed position while the range selector remains in its neutral position, the pocket thus clearing the lug and becoming laterally alined with a notch for lateral shifting of the lever into such notch and for travel along the front portion of the zig-zag slot to rock the range selector through an angular range determined by the length of said front slot portion while the speed selector remains in said selected speed position, and said lever being shiftable laterally through the crossover to travel along the rear portion of the zig-zag slot for rocking the range selector through an additional range determined by the length of said rear portion.

2. Shifting mechanism for a multi-speed, multi-range transmission, comprising: a support; a range selector and a speed selector carried by the support in laterally spaced apart side-by-side relation for independent fore-and-aft movement out of and back to respective neutral positions, said selectors respectively having fore-and-aft elongated flanges extending laterally toward each other in overlapped relation; said range selector flange having front and rear, fore-and-aft spaced notches opening laterally toward the speed selector and separated by an intervening lug projecting laterally toward said speed selector; said speed selector flange having therein a pocket opening laterally toward the range selector and laterally blocked by said lug when both selectors are neutrally positioned, said speed selector flange further having a zig-zag slot including front and rear fore-and-aft extending portions laterally offset and interconnected by a crossover portion, said crossover portion lying behind the lug and in vertical register with the rear notch, the rear portion lying adjacent to the range selector and extending rearwardly past the rear notch, and the front portion lying remote from the range selector and extending forwardly past the lug to intersect the pocket and to register vertically with the front notch when both selectors are neutrally positioned; a shift lever extending upwardly through the pocket to be confined by the lug against lateral escape from said pocket; and means mounting the shift lever on the support for both fore-and-aft and lateral shifting relative to the selectors, whereby the pocket-received lever is movable selectively forwardly or rearwardly to move the speed selector to a selected speed position while the range selector remains in its neutral position, the pocket thus clearing the lug and becoming laterally alined with a notch for lateral shifting of the lever into such notch and for travel along the front portion of the zig-zag slot to move the range selector through a fore-and-aft range determined by the length of said front slot portion while the speed selector remains in said selected speed position, and said lever being shiftable laterally through the cross-over to travel along the rear portion of the zig-zag slot for moving the range selector through an additional fore-and-aft range determined by the length of said rear portion.

3. The invention defined in claim 2, including: an index plate carried by the support and overlying the selectors, said plate having an opening therein through which the lever and speed selector flange are visible, said speed selector flange overlying the range selector flange, said plate having indicia thereon indicating positions for the speed selector and said speed selector flange having indicia thereon indicating positions for the range selector.

4. The invention defined in claim 2, including: lock means actuated by movement of the range selector, after the speed selector has been moved out of its neutral position to a selected speed position, for locking the speed selector in such selected speed position whereby the ends and the crossover portion of the zig-zag slot serve as limit means on movement of the lever and range selector.

References Cited in the file of this patent
UNITED STATES PATENTS

| | | |
|---|---|---|
| 1,727,646 | Hunt et al. | Sept. 10, 1929 |
| 2,115,390 | Lasley et al. | Apr. 26, 1938 |
| 2,446,263 | Court | Aug. 3, 1948 |